(12) United States Patent
Tong

(10) Patent No.: US 6,791,232 B2
(45) Date of Patent: Sep. 14, 2004

(54) GENERATOR GAS SHIELD AND RELATED METHOD

(75) Inventor: Wei Tong, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/457,561

(22) Filed: Jun. 10, 2003

(65) Prior Publication Data

US 2004/0032172 A1 Feb. 19, 2004

Related U.S. Application Data

(62) Division of application No. 10/064,750, filed on Aug. 13, 2002, now Pat. No. 6,700,238.

(51) Int. Cl.$^7$ ................................................. H02K 3/46
(52) U.S. Cl. ......................... 310/270; 310/260; 310/52; 310/57; 310/56; 310/58
(58) Field of Search ............................ 310/56, 57, 52, 310/58, 260, 270

(56) References Cited

U.S. PATENT DOCUMENTS 4,071,790 A * 1/1978 Darby et al. .................. 310/59
4,286,183 A * 8/1981 Montgomery ................. 310/62
4,318,021 A * 3/1982 Jahansoon .................... 310/260
6,285,110 B1 9/2001 Tong et al.
6,346,755 B1 2/2002 Tong et al.
6,392,320 B1 5/2002 Glahn et al.
6,396,176 B1 * 5/2002 Mokri .......................... 310/58
6,455,959 B1 9/2002 Demont et al.
6,462,458 B1 * 10/2002 Tong et al. .................. 310/270
6,700,238 B1 * 3/2004 Tong ............................ 310/58

FOREIGN PATENT DOCUMENTS

JP        58029341 A  *  1/1983  .......... H02K/5/200

* cited by examiner

Primary Examiner—Dang Le
Assistant Examiner—Iraj A. Mohandesi
(74) Attorney, Agent, or Firm—Nixon & Vanderhye P.C.

(57) ABSTRACT

A generator gas shield includes an annular ring body having an outer radially extending flange terminating at a first free end of a first diameter; a curved inlet portion; a substantially axial portion surrounding a center opening, and a curved outlet portion terminating at a second free end of a second diameter smaller than the first diameter.

5 Claims, 3 Drawing Sheets

GENERATOR GAS SHIELD AND RELATED METHOD

This application is a division of Ser. No. 10/064,750 filed Aug. 13, 2002, now U.S. Pat. No. 6,700,238.

BACKGROUND OF THE INVENTION

This invention relates to improving the cooling of armature bars at the generator endwinding region, and specifically, to a new generator gas shield that more effectively distributes cooling flow to that region.

In the process of producing electricity, power generators also create heat that must be dissipated away from the generator. Heat occurs in generators due primarily to friction and current. Frictional heating occurs as the rotor spins at high speed in the generator. Similarly, heating also occurs as current flows through the rotor and stator coils, as these coils rotate relative to one another in the magnetic fields of the generator. Generators are typically equipped with cooling systems to transfer heat from the stator and rotor away from the generator.

The stator winding coils are made up of bundles of strands of insulated copper wires that are embedded in the slots of the stator core. At the ends of each coil, the copper wires are brazed together to form the armature bar leads. The armature bars are separated by armature bar blocks and are bonded with binding bands, with the loop ends enclosed in series loop caps. Consequently, cooling flows passing through the armature bars are considerably complex.

In modern high-powered, large-size generators, gas shields are used for two purposes: (1) to separate the low pressure side of the rotor fan from the high pressure side, and (2) to direct cooling flows toward the armature bars and current connection rings. However, the cooling purpose has been generally overlooked by generator design engineers.

Presently there are two general configurations of gas shields: contoured and conical. Contoured gas shields are used with axial fans to provide airflow into the inlet side of the fan. Conical (or straight) gas shields are used with axial flow fans where flow entry into the fan is not critical. Gas shields are generally mounted to the frame section plate just inboard of the end plate. When they are mounted to an intermediate inner end shield, they are called nozzle shields. This invention is related to the type of contoured gas shields that are used in both forward-flow and reverse-flow generators.

In a typical contoured gas shield arrangement, the gas shield is mounted on the frame section plate. A radial clearance of 0.060"±0.010" is held between the fan blade tips and a toothed insert in the gas shield. However, this design cannot guarantee sufficient cooling for armature bars, and especially for series loop caps. As a result, hot spots may appear on the armature bars.

BRIEF DESCRIPTION OF THE INVENTION

In order to improve cooling effectiveness of armature bars, a robust design for gas shields is highly desirable. We have found that several design changes in known generator gas shield configurations can be implemented for better controlling the flow distribution at the fan flow exit, including:

(a) Optimizing the gas shield profile—A significant change in the gas shield redesign is to use an aerodynamically smooth surface at the fan flow exit. Specifically, the gas shield includes an annular ring body with an outer, radially extending wall terminating at a first free end on the fan inlet side. The annular ring body also projects beyond the fan flow exit via an axially extending portion that surrounds a center opening, with the axially extending portion bent back towards the armature bar. Thus, on the exit side of the fan, the shield leads the cooling gas to flow along its aerodynamically smooth surface to cool the armature bars. A gap formed between the second free end of the gas shield and the armature bar edge can be used to control the flow rates through the main body of the armature bar and towards the series loop caps.

(b) Adding ventilation holes—In order to bring the cooling gas directly to the series loop caps, a number of ventilation holes are provided circumferentially near the gas shield edge on the fan flow exit or outlet side. These ventilation holes serve as gas nozzles to impinge the cooling gas directly on the series loop cap surfaces (as well as current connection rings). The heat transfer coefficient associated with directly impinging jets is several times higher than normal through-flow coefficients, so that the armature bar realizes much higher heat transfer.

With the above changes, the gas shield in accordance with this invention provides better control of the cooling flow, in that the latter is split at the front of the centering ring to enter into the rotor-subslot, rotor-stator gap, and armature bars. The series loop caps are cooled by flow from ventilation holes and through the gap between the gas shield and armature bars.

Accordingly, in its broader aspects, the invention relates to a generator gas shield comprising an annular ring body having an outer radially extending flange terminating at a first free end of a first diameter; a curved inlet portion; a substantially axial portion surrounding a center opening, and a curved outlet portion terminating at a second free end of a second diameter smaller than the first diameter.

In another aspect, the invention relates to generator comprising a rotor and a stator, and an axial flow fan, the stator having an endwinding region including circumferentially spaced armature bars arranged about the rotor, with a radial cooling gap between the stator and rotor; the armature bars terminating at loops enclosed within a corresponding number of series loop caps; and an annular gas shield having an outer radially extending flange secured to a section plate of the stator; a curved inlet portion; an axial portion defining a center opening surrounding the axial flow fan and including a seal insert adapted to cooperate with and establish a seal with blades of the axial flow fan; and a curved outlet portion terminating at a location proximate the armature bars.

In still another aspect, the invention relates to a method of cooling armature bars in a generator comprising a rotor and a stator, and an axial flow fan, the stator having an endwinding region including circumferentially spaced armature bars arranged about the rotor, with a radial cooling gap between the stator and rotor; the armature bars terminating at loops enclosed within a corresponding number of series loop caps; the method comprising a) providing an axial flow fan radially inward of the series loop caps to direct cooling air axially into the endwinding region; b) directing cooling air from the axial flow fan along a smooth surface to the armature bars; and c) providing nozzles in the smooth surface adjacent the series loop caps to impingement cool the series loop caps with the cooling air.

The invention will now be discussed in greater detail in connection with the drawings described briefly below.

DETAILED DESCRIPTION OF THE INVENTION

Figure 1:
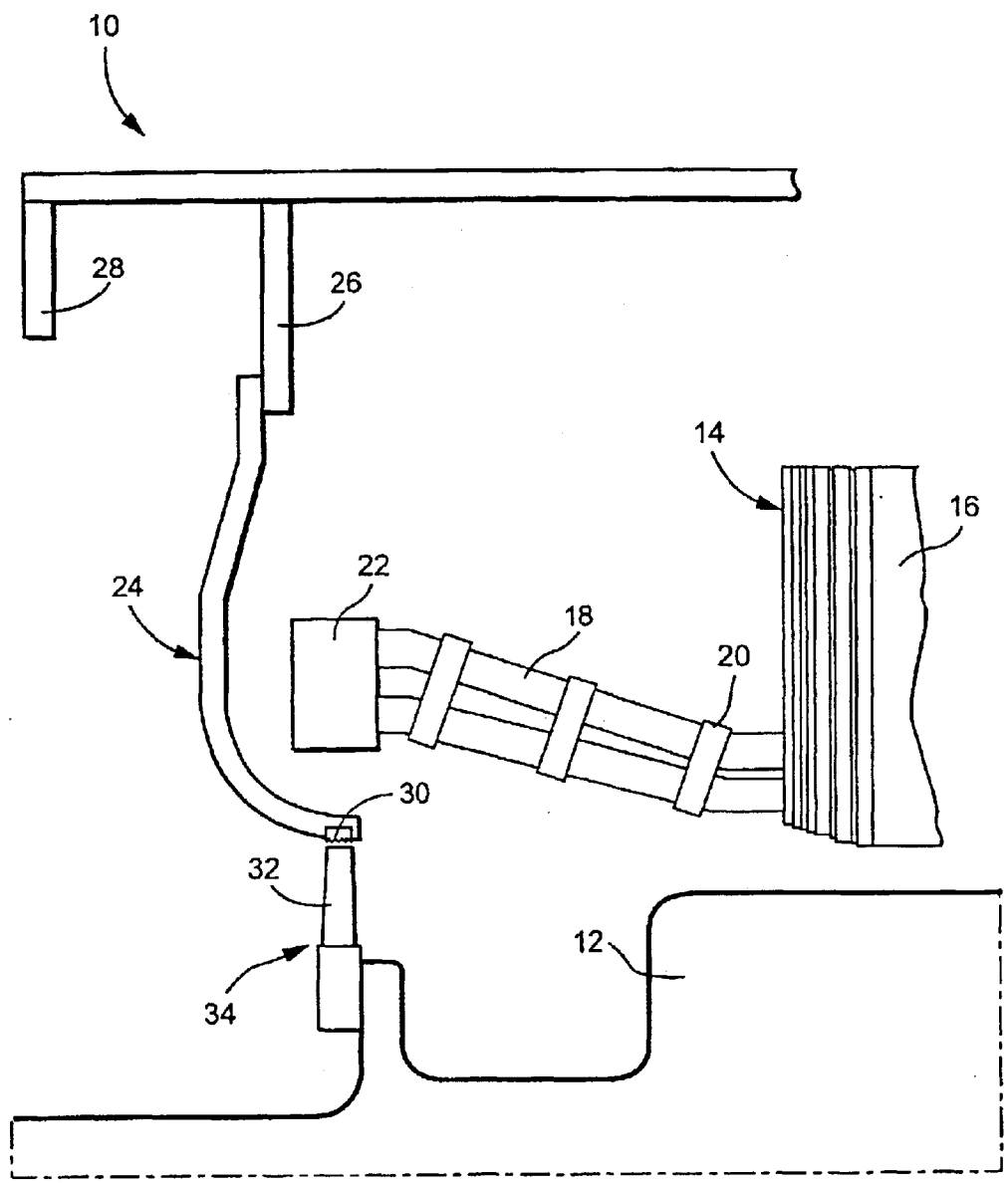
FIG. 1 is a partial side elevation of the endwinding region of a generator, illustrating in schematic form, a typical contoured generator gas shield.

FIG. 1 shows the endwinding region of a generator 10 that includes a rotor 12 and stator 14. The stator winding coils are made up of bundles of strands of insulated copper wires that are embedded in slots in the stator core 16. At the ends of each coil, the copper wires are braised together to form leads for the armature bars 18. The armature bars are separated by armature bar blocks (not shown) and are bonded with binding bands 20.

The armature bar loops are enclosed within series loop caps 22 that, as will be appreciated by those skilled in the art, are located at circumferentially spaced locations about the rotor and stator. A conventional gas shield 24 is secured at its radially outer end to the section plate 26, located axially inside the stator end plate 28.

The radially inner end of the gas shield includes a seal element 30 that is located closely adjacent the blades 32 of an axial fan 34 that provides cooling flow to the generator. Typically, a radial clearance of about 0.060±0.010 inch is held between the fan blade tips and the seal insert within the gas shield. As already noted, however, this design cannot ensure sufficient cooling for the armature bars, and/or the series loop caps. In this regard, note that the shield 24 lies virtually entirely on the inlet side of the fan 34.

Figure 2:
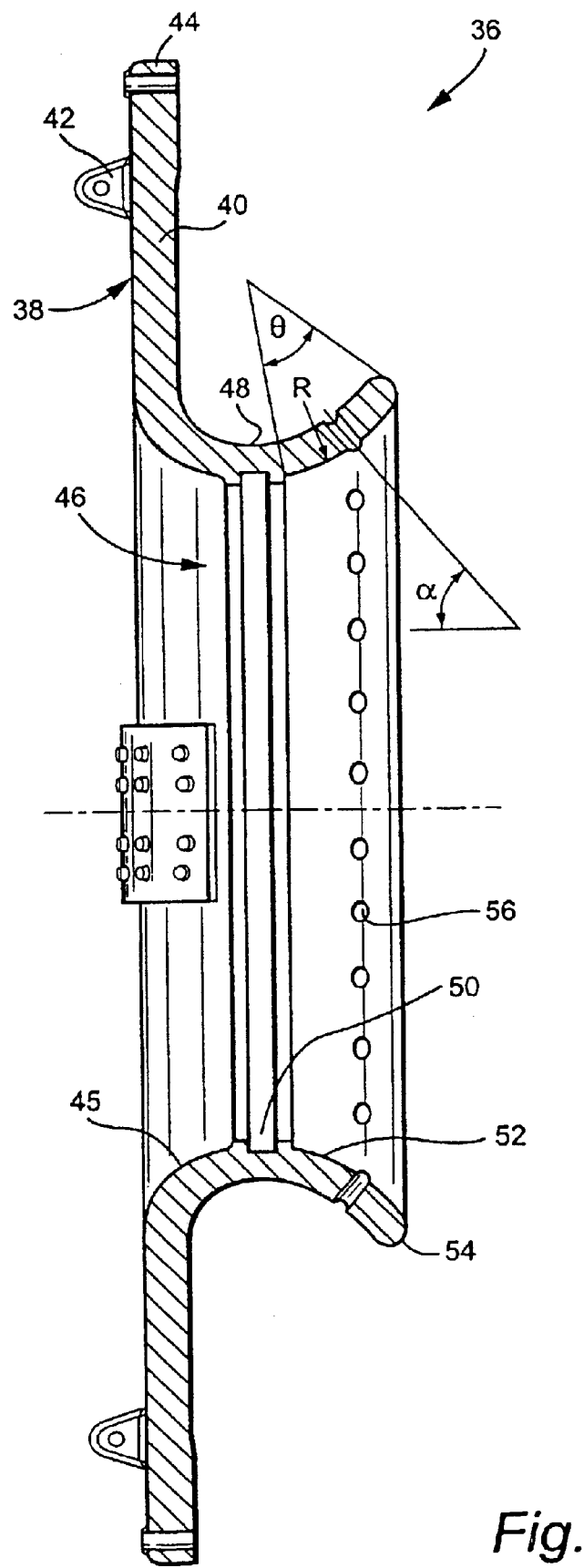
FIG. 2 is a side section illustrating a generator gas shield in accordance with an exemplary embodiment of this invention.

Turning now to FIG. 2, a newly designed gas shield 36 in accordance with an exemplary embodiment of this invention, includes an annular ring body 38 that includes a radial flange 40 provided with mounting gussets 42 adjacent a first free end of the ring body. These gussets 42 are used to secure the gas shield to the section plate 26 on the inlet side of the fan. The gas shield terminates in the radial outward direction at a first free edge 44 of a relatively larger diameter. The gas shield extends radially inwardly through a curved air inlet portion 45 and then axially where it defines a center opening 46 that surrounds the fan blades. The axial portion 48 defines a second smaller diameter and includes a seal insert recess 50 for a toothed or other seal element. The shield is then bent back toward the armature bars (see FIG. 3) so as to create an aerodynamically smooth, curved outlet portion 52 on the exit or outlet side of the fan, terminating at a second free end 54 of a diameter greater than the second diameter but smaller than the first diameter. The gas shield thus directs the cooling gas flow along the aerodynamically smooth outlet portion 52 of the shield to cool the armature bars. The gap formed between the gas shield tip and the armature bar edge (see FIG. 3) can be used to control the flow rates through the main body of the armature bar and towards the series loop caps. The gas shield profile at the fan flow exit is primarily determined by two design parameters: radius R and angle θ. The values of R and θ may vary according to the generator type. The aerodynamically smooth surface at the gas shield tip reduces the flow drag course and windage loss.

In order to bring the cooling gas directly to the series loop caps, a number of ventilation holes 56 are provided at circumferentially spaced locations, near the gas shield edge on the exit or outlet of the fan. These ventilation holes serve as gas nozzles to cause the cooling gas to impinge directly on the series loop cap surfaces (as well as current connection rings). The heat transfer coefficient associated with directly impinging the cooling air is several times higher than normal flow through coefficients.

The number of ventilating holes 56 should be equal to the number of armature bars or series loop caps. The angle of the ventilation hole a is determined by the location of the gas shield to the armature bars, usually ranging from about 40° to about 70°.

Figure 3:
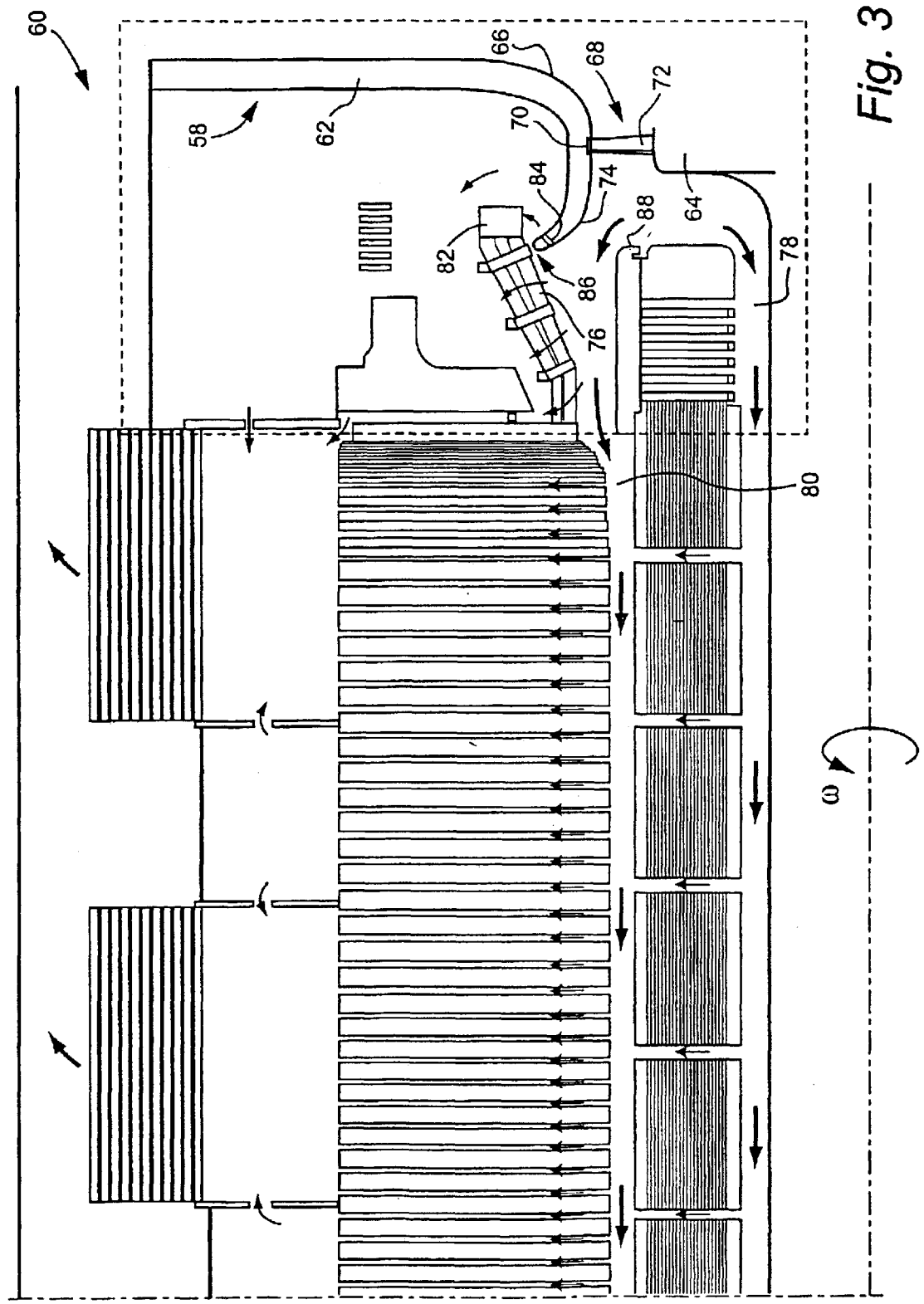
FIG. 3 is a side section in schematic form, illustrating the endwinding region of a generator incorporating a generator gas shield in accordance with another exemplary embodiment of this invention.

Turning to FIG. 3, a modified generator gas shield 58 in accordance with another exemplary embodiment of this invention is shown, in place within the endwinding region of a generator 60. The shield 58 is similar to the shield 36 but adapted to particular generator application. The shield includes a radial flange 62 on the inlet side of the fan 64 that leads to a curved air inlet portion 66 and an axial section that defines the center opening 68 surrounding the fan. The axial section includes a seal insert 70 that lies closely adjacent the tips of the fan blades (one shown at 72). On the exit or outlet side of the fan, the shield includes an aerodynamically curved outlet portion 74 that extends outwardly to a location adjacent the armature bars 76. Note that the cooling gas flow from the ventilating fan 62 splits into several branches along the aerodynamic surface on the outlet side of the fan 64, with cooling air directed to the rotor-subslot 78, rotor-stator gap 80 and armature bars 76. The series loop caps 82 are cooled by flows from ventilation holes 84 and through the gap 86 between the gas shield and the armature bars. By locating the ventilating holes 84 directly adjacent the circumferentially spaced loop caps 82, impingement cooling of the series loop caps is facilitated. It will further be appreciated that the very small radial gap 86 between the tip of the gas shield 58 and the armature bars 76, results in impingement cooling of the armature bars.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A generator comprising a rotor and a stator, and an axial flow fan, the stator having an endwinding region including circumferentially spaced armature bars arranged about the rotor, with a radial cooling gap between the stator and rotor, with a radial cooling gap between the stator and rotor; the armature bars terminating at loops enclosed within a corresponding number of series loop caps; and an annular gas shield having an outer radially extending flange terminating at one end having a first diameter and secured to a section plate of said stator; a curved inlet portion; an axial portion having a second diameter defining a center opening surrounding said axial flow fan and including a seal insert adapted to cooperate with and establish a seal with blades of said axial flow fan; and a curved outlet portion at an opposite end having a third diameter smaller than said first diameter but greater than said second diameter and terminating at a location proximate said armature bars.

2. The generator of claim 1 wherein said curved outlet portion is provided with a plurality of circumferentially spaced ventilation holes.

3. The generator of claim 2 wherein said ventilation holes are located so as to be adjacent said series loop caps.

4. The generator of claim 2 wherein said curved outlet portion establishes a flow path in a first direction toward a gap between the rotor and the stator, and wherein said ventilation holes establish a flow path in a second direction counter to said first direction.

5. The generator of claim 4 wherein said ventilation holes are arranged at an angle of between about 4–70° relative to a horizontal rotor axis.

* * * * *